United States Patent Office 3,528,848
Patented Sept. 15, 1970

3,528,848
POLYURETHANE COATED RUBBER
Hans Zoebelein, Monheim, Rhineland, Germany, assignor to Henkel & Cie, G.m.b.H., Holthausen, Germany, a corporation of Germany
No Drawing. Filed Aug. 17, 1967, Ser. No. 661,195
Claims priority, application Germany, Sept. 14, 1966, H 60,528
Int. Cl. B32b 27/08, 27/40
U.S. Cl. 117—138.8                             4 Claims

ABSTRACT OF THE DISCLOSURE

A rubber article containing a hydroxylated butadiene polymer having a cured polyurethane lacquer coating is disclosed.

PRIOR ART

The rubber industry often wishes to provide rubber products with a durable, protective coating to increase the resistance of vulcanized rubber to abrasion, ozone, solvents and sunlight. Many times decorative effects govern the desire for such coatings. At one time, lacquers having a shellac and sulfurized linseed oil base were usually used for this purpose, but presently polyurethane lacquers are usually used. Particularly preferred are moisture hardenable, pigmented or unpigmented polyurethane lacquers having an isocyanate terminal group since they meet the necessary requirements to a high degree. However, aside from the quality of the coating, good adhesion of the coating to the rubber substrata is of prime importance to obtain prolonged protection.

Up to now, good adhesion of polyurethane lacquer coatings to the rubber articles could be obtained only by a cumbersome and time consuming pre-treatment of the rubber surface. The usual process as described by Saunders et al., High Polymer, vol. XVI, "Polyurethanes," part II, 1964, pp. 589–590, consists of meticulously cleaning the rubber surface with a solvent or a solution of a wetting agent and then chlorinating the rubber surface with a 5% sodium hypochlorite solution. The rubber article then had to be rinsed with water and dried before it was ready for the application of the polyurethane coating. This pretreatment is not only time consuming but also requires additional equipment for the hpyochlorite treatment and working with hypochlorites is also unpleasant and undesirable.

OBJECTS OF THE INVENTION

It is an object of the invention to provide an improved method of forming firmly adhering polyurethane coatings on rubber products.

It is another object of the invention to provide improved rubber products having a polyurethane coating.

These and other objects and advantages of the invention will become obvious from the following detailed description.

THE INVENTION

The novel method of the invention of forming firmly adhering polyurethane coatings on rubber products comprises applying a coating of a moisture hardenable polyurethane lacquer to an article made of a natural or synthetic rubber containing a polymer selected from the group consisting of butadiene homopolymers and butadiene copolymers containing hydroxyl groups. The said process has the advantage of providing in a simple manner rubber articles with a firmly adhering, moisture hardenable polyurethane coating without any expensive, cumbersome pretreatment and without effecting the desired technical properties of the rubber articles.

The rubber articles can be formed of any natural or synthetic rubber mixtures containing 0.5 to 5 parts by weight per 100 parts by weight of rubber base of a butadiene polymer containing hydroxyl groups which is added to the rubber mixture before vulcanization thereof. The rubber mixture can contain any of the usual ingredients added thereto such as carbon black, vulcanizing agents, etc. Examples of suitable rubber bases are natural rubber, styrene-butadiene caoutchouc, nitrile caoutchouc, chloroprene-butyl caoutchouc, etc. After vulcanization of the rubber mixture, the rubber surface merely has to be washed with a solvent or a solution of a wetting agent to remove any adhering separate particles thereon.

Examples of suitable butadiene polymers having a good rubber tolerance and containing hydroxyl groups that can be worked into all kinds of rubber are hydroxyl polybutadienes and hydroxyl groups containing copolymers of butadiene and styrene or of butadiene and acrylonitrile having a molecular weight of 2000–3500. The said polymers preferably contain terminal hydroxyl groups and have a hydroxyl number of 40 to 55 which give remarkable results. These polymers are known commercial products and are sold on the market under the designation of Poly BD R15M, R45M, CS 15 and CN 15. The addition of the butadiene polymers containing hydroxyl groups is best effected during the mixing process in the usual mixing devices such as mixers with the polymer being added most advantageously to the fillers.

The polyurethane lacquers are well known. Particularly preferred are moisture hardenable polyurethane having isocyanate groups, with or without pigments. Examples of suitable polyurethanes are described in Rubber Age, vol. 89, No. 6, September 1961, pages 979 to 987, "Urethane Coatings for Rubber Products" by H. Earl Hill.

In the following examples there are described several preferred embodiments to illustrate the invention. However, it should be understood that the invention is not intended to be limited to the specific embodiments.

Example I

Test rubber samples were prepared by mixing in a mixer 100 parts by weight of Ameripol 1500 (a styrene-butadiene rubber), 50 parts by weight of Corax 3 (carbon black), 5 parts by weight of zinc oxide, 1 part by weight of stearic acid, 8 parts by weight of Paraflux (an asphalt resin), 1.75 parts by weight of sulfur, 1.25 parts by weight of Vulkazit CZ (benzothiazyl-2-cyclohexyl-sulfenamide) and varying amounts of Poly BD R15M (butadiene homopolymer containing hydroxyl groups) having a hydroxyl number of 45 and a molecular weight of about 3200. The resulting mixtures were vulcanized for 30 minutes at 153° C. and the resulting rubber sheets were washed with trichloroethylene and then were cut into 1 inch wide strips. A 2 cm. section of the said strips which were about 12 cm. long was dipped into a common chlorinated rubber lacquer which adheres very slightly to rubber to facilitate the latter separation of the lacquer layer.

A moisture hardenable polyurethane lacquer was prepared by refluxing a mixture of 23 gm. of propoxylated trimethylolpropane having a molecular weight of 700 and 17 gm. of toluylene diisocyanate (80% of 2,4-isomer and 20% of 2,6-isomer) in a mixed solvent comprised of 20 parts by weight of butylglycol acetate and 40 parts by weight of xylene to obtain a lacquer having a NCO to OH ratio of 2:1.

The previously prepared rubber strips were dipped 5 times into the said polyurethane lacquer to coat a different 2 cm. section each time to obtain as uniform a layer thickness across the entire rubber strip as possible. The strips were then dried at room temperature in a relative humidity of 50%. The coating was cut adjacent to the section of the rubber strip coated with the chlorinated rubber lacquer whereby one end of the polyurethane coating was exposed whereby the coating could be peeled off in a tensile strength test machine at an angle of 180°. The amount of energy required for each strip is shown in Table I.

TABLE I

| Test No. | Amount of Poly BD R15M in rubber, parts by weight | Energy required to strip coating, kg. |
|---|---|---|
| 1 | 0 | 1.7 |
| 2 | 0.5 | 3 |
| 3 | 1.0 | 5.8 |
| 4 | 2.5 | 9.5 |
| 5 | 5.0 | 8.3 |

The desired properties of the vulcanized rubber such as tear resistance, ultimate elongation, modulus, rebound elasticity and shore hardness were not noticeably effected by the addition of the butadiene homopolymers containing hydroxyl groups. Rubber strips using the mixtures of tests 1 and 4 of Table I were subjected to comparison tests using DIN standard test No. 53,504 and 53,505 and the results are shown in Table II.

TABLE II

| Plate vulcanization for 30 minutes at 153° C. | Test Sample 1 | Test Sample 4 |
|---|---|---|
| Unaged: | | |
| Tensile strength $\sigma 300$. | 89 kp./cm.$^2$=100% | 73 kp./cm.$^2$=100%. |
| Shear strength | 196 kp./cm.$^2$=100% | 199 kp./cm.$^2$=100%. |
| Critical elongation | 509%=100% | 566%=100%. |
| Shore hardness | 61° SH | 57° SH. |
| Rebound elasticity | 39.5% | 39.0%. |
| Aged 7 days at 70° C.: | | |
| Tensile strength $\sigma 300$. | 140 kp./cm.$^2$=157% | 118 kp./cm.$^2$=162%. |
| Shear strength | 191 kp./cm.$^2$=97.5% | 206 kp./cm.$^2$=103.5%. |
| Critical elongation | 379%=74.5% | 449%=79.5%. |
| Shore hardness | 66° SH | 65° SH. |
| Rebound elasticity | 41.0% | 42.0%. |

Example II

Natural rubber samples were prepared by mixing in a mixer 100 parts by weight of natural smoked sheets, 2 parts by weight of stearic acid, 10 parts by weight of zinc oxide, 2 part by weight of pine tar, 1 part by weight of phenyl-β-naphthylamine, 25 parts by weight of EPC carbon black, 1.5 parts by weight of dibenzothiazyl disulfide, 0.2 part by weight of zinc N-dimethyldithiocarbamate, 2.75 parts by weight of sulfur and 0 or 2.5 parts by weight of butadiene homopolymer Poly BD R45M having a hydroxyl n umber of 53 and a molecular weight of 2200 to 2500. The resulting mixtures were vulcanized at 153° C. for 10 minutes and the resulting rubber sheets were wiped with trichloroethylene.

Using the procedure of Example I, rubber strips were coated with a polyurethane lacquer and then the coating was peeled off with the tensile strength machine at an angle of 180°. The coating on the rubber without the butadiene homopolymer containing hydroxyl groups was removed without effort while the coating on the rubber containing the said butadiene homopolymer required 8 to 9 kg. to strip it off.

Example III

Test rubber samples were prepared by mixing in a mixer 100 parts by weight of Neoprene W, 2 parts by weight of phenyl-β-naphthylamine, 4 parts by weight of magnesium oxide, 2 parts by weight of paraffin wax, 60 parts by weight of Durex O (carbon black), 10 parts by weight of naphthene oil, 5 parts by weight of zinc oxide, 1 part by weight of the salt of di-o-tolylguanidine and dipyrocatechol borate and 0 and 2.5 parts by weight of Poly BD CN15 (85% butadiene–15% acrylonitrile copolymer) having a hydroxyl number of 45 and a molecular weight of 2500–3000. The resulting mixtures were vulcanized for 15 minutes at 160° C. and the resulting rubber sheets were washed with trichloroethylene.

Using the procedure of Example I, rubber strips were coated with a polyurethane coating and the said coatings were then peeled off with the tensile strength machine at an angle of 180°. The polyurethane coating on the rubber without the butadiene copolymer containing hydroxyl groups adhered very poorly while the coating on the rubber containing 2.5 parts of Poly BD CN15 required 8 to 9 kg. to strip it off.

Various modifications of the compositions and method of the invention may be made without departing from the spirit or scope thereof.

I claim:
1. A polyurethane coated rubber article comprising a natural or synthetic substrate containing 0.5 to 5 parts by weight per 100 parts by weight of rubber of a hydroxyl containing polymer selected from the group consisting of butadiene homopolymers and butadiene copolymers having a hydroxyl number of 40 to 55 and a molecular weight of 2000 to 3500 and a firmly adhering, cured coating thereon of a moisture hardenable polyurethane lacquer, the surface of the substrate being unmodified.
2. The article of claim 1 wherein the hydroxy containing polymer is a hydroxy butadiene homopolymer.
3. The article of claim 1 wherein the hydroxy containing polymer is a styrene-butadiene copolymer containing hydroxy groups.
4. The article of claim 1 wherein the hydroxy containing polymer is a butadiene-acrylonitrile copolymer containing hydroxy groups.

References Cited

UNITED STATES PATENTS

| 2,695,834 | 11/1954 | De Nie | 260—5 |
| 3,011,984 | 12/1961 | Muessig et al. | 260—5 |
| 3,080,255 | 3/1963 | Winkelmann | 117—47 |
| 3,098,755 | 7/1963 | Barth et al. | |
| 3,385,829 | 5/1968 | Heydkamp et al. | |

WILLIAM D. MARTIN, Primary Examiner

J. E. MILLER, Assistant Examiner

U.S. Cl. X.R.

117—139, 161; 161—190; 260—2.5